April 25, 1961 P. M. BAYON 2,980,918
BELT WITH CLOSING DEVICE
Filed Feb. 7, 1958
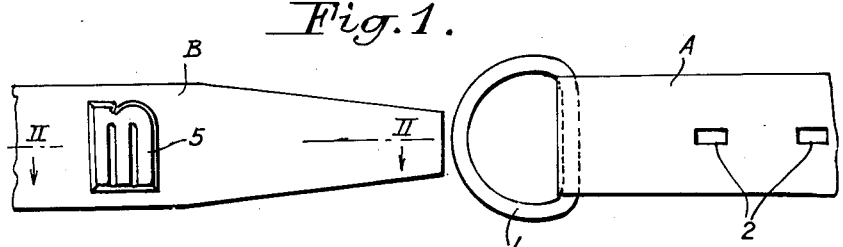
Fig. 1.
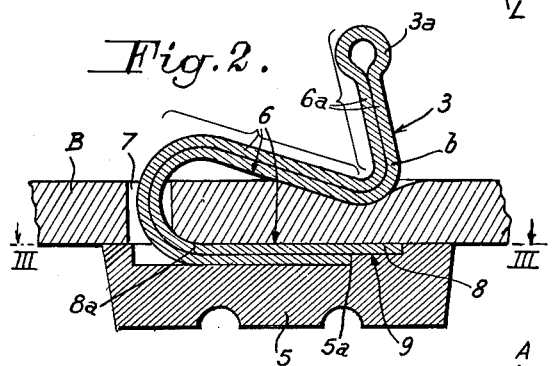
Fig. 2.
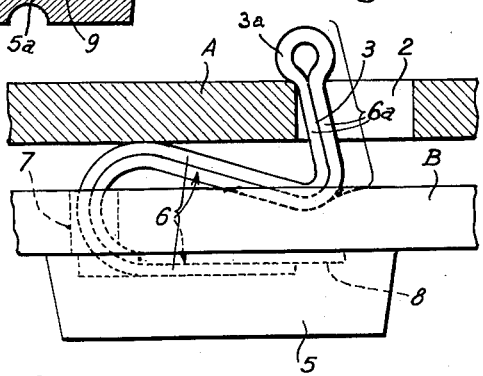
Fig. 4
Fig. 3.
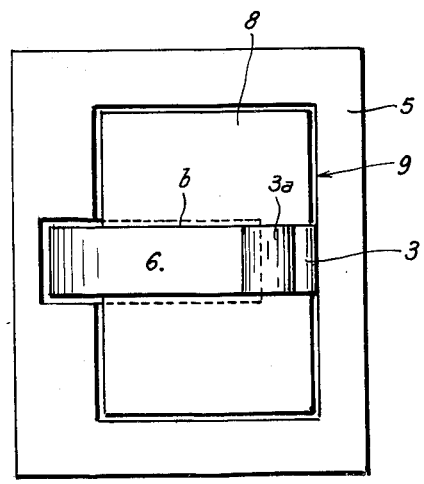
Inventor:
Patrice Marie Bayon
by: J. Delatte Ayuy
Attorney

United States Patent Office 2,980,918
Patented Apr. 25, 1961

2,980,918
BELT WITH CLOSING DEVICE

Patrice Marie Bayon, 55 Rue Desjardins, Angers, France

Filed Feb. 7, 1958, Ser. No. 713,989

Claims priority, application France Feb. 18, 1957

1 Claim. (Cl. 2—321)

This invention relates to a belt having a closing device including a fixed hook member cooperating with perforations formed in a portion of the belt, of the kind in which the hook member is carried by the free belt end portion, on the rear face thereof, whereas the perforations are formed in the fixed belt end portion and the latter carries at its end a loop devoid of retaining means, through which the free belt end portion is passed. The main advantage of this kind of closure system for belts is the fact that the perforations are hidden when the belt is closed.

The invention relates more particularly to improvements in a belt of this kind in which the hook member is secured to, or integral with, a base member mounted on the free belt end portion by means of a rivet whose head is exposed on the front side thereof and advantageously constitutes an ornament, or may be covered by an ornamental piece.

According to the invention, the unit comprising the hook member adapted to engage perforations formed in the fixed belt end portion, and the base member or ornamental piece exposed on the front face of the free belt end portion, is detachably mounted on said free belt end portion.

In an embodiment, to which the invention is however not limited, the hook member is connected to the base member or ornamental piece by a part forming a second hook member which is engaged through a hole formed to this effect in the free belt end portion.

The appended drawing represents by way of example an embodiment of the invention.

Fig. 1 is a front elevation of the two end portions of the belt, in unclosed condition.

Fig. 2 is a sectional view on line II—II of Fig. 1, at a larger scale.

Fig. 3 is a rear elevation, taken on line III—III of Fig. 2, of the unit comprising the hook member and the ornamental piece.

Fig. 4 is a partial plan view, with longitudinal section of the fixed belt end portion, showing the belt in closed condition.

On the drawing, A designates the fixed or first belt end portion and B designates the free or second belt end portion. The fixed belt end portion A carries an end loop L and is formed with perforations 2, whereas the free belt end portion B carries the hook member 3 projecting from its rear face and the base member or ornamental piece 5 exposed on its front face.

According to the invention, the unit formed by the hook member 3 and the base member or ornamental piece 5 is detachably mounted on the free belt end portion B.

In the shown embodiment (Figs. 2 and 3), the hook member 3 is connected to the ornamental piece 5 by a part 6 which forms a second hook portion and by a first hook portion 6a of the hook member 3 the hook portions 6 and 6a being bent back onto each other and being formed in the shape of a substantially S-shaped clip (Figs. 2, 4). This hook member 3, its hook portions 6 and 6a are hooked in a hole 7 formed to this effect in the free belt end portion B. The length of portion 6 is greater than that of portion 6a. As shown on Figs. 2 and 4, the second hook portion 6 is shaped as a clip which grips the material of the belt portion B, while the first hook portion 6a of said hook member forms an acute angle in the direction opposite to the clip, but the angle is open enough to allow passage of the hook member 3 through hole 7 and perforations 2. It will be noted that no part of the hook member 3 is visible from the front of the free belt end portion.

Advantageously, the hook member 3, consisting of portions 6 and 6a, is formed by bending back upon itself a flat metal strip b to form portion 6 integral with portion 6a (Fig. 2). This forms a retaining bulge 3a at the rear end of hook member 3, said bulge engaging the rear wall of fixed belt end portion A when the hook member has been passed through a perforation 2. The front end of portion 6 is connected at 8a with the end of a small plate 8 disposed adjacent to the front face of the free belt end portion B and which may, for example, be welded to the face of a recess 9 formed at one end of the inner rear face of the base member or ornamental piece 5. The forwardmost part of portion 6 fits between the rear face of piece 5 and the front face of plate 8 and parallel thereto in a second recess 5a of piece 5.

The mounting of the unit 3—5 on the free belt end portion B is easily performed by folding the latter at the place marked by the hole 7 and pushing the hook 3 into position through said hole and sliding the unit 3—5 along the belt portion B so that the clip snaps on the body of belt portion B (Fig. 2), whereafter the belt end portion B is released. The removal of the unit 3—5 is also easily performed when the belt portion B is folded as aforesaid.

The invention is not limited to the embodiment which has been described and shown, but covers also modification thereof, within the scope of the appended claim.

It is also obvious that the invention relates to belts irrespective of their size and destination and therefore covers also bracelets, for example for wrist watches.

I claim:

A belt with closing device, comprising: a first belt end portion having a front face and a rear face and formed with at least one perforation, a loop at the end of said first belt end portion; a second belt end portion having a front face and a rear face and having a hole, said second belt end portion being adapted to be passed through said loop, with the rear face of said second belt end portion overlying the front face of said first belt end portion; a hook member consisting of a substantially S-shaped strip forming a first hook portion and a second hook portion, the latter having a front free end; a base member fastened to said free end; said second hook portion forming a clip for detachably fastening said hook member on said second belt end portion by passage of said hook member through said hole in such a manner that said base member is exposed on the front face of said second belt end portion and that said first hook portion projects beyond the rear face of said second belt end portion, said second hook portion being then engaged through said hole and clasping said second belt end portion, said first hook portion then projecting beyond the rear face of said second belt end portion being adapted to engage said perforation of said first belt end portion, upon translation of said second belt end portion through said loop onto and over said first belt end portion, to close the belt; said hook member being invisible from the front face of said second belt end portion.

(References on following page)

References Cited in the file of this patent

UNITED STATES PATENTS

| | | |
|---|---|---|
| 1,317,993 | Smith | Oct. 7, 1919 |
| 1,682,450 | Wanniger | Aug. 28, 1928 |
| 1,802,883 | Deibner | Apr. 28, 1931 |
| 2,200,047 | Tinnerman | May 7, 1940 |
| 2,271,784 | Tritt | Feb. 3, 1942 |
| 2,336,144 | Wickstrom | Dec. 7, 1943 |

FOREIGN PATENTS

| | | |
|---|---|---|
| 494,367 | Great Britain | Oct. 25, 1938 |
| 1,140,666 | France | Mar. 4, 1957 |